United States Patent
Morikawa

(10) Patent No.: US 7,023,493 B2
(45) Date of Patent: Apr. 4, 2006

(54) METHOD FOR MUTUALLY CONTROLLING A PLURALITY OF VIDEO DISPLAY AND REPRODUCING DEVICES

(75) Inventor: Shigekazu Morikawa, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 513 days.

(21) Appl. No.: 10/177,121

(22) Filed: Jun. 24, 2002

(65) Prior Publication Data

US 2002/0197056 A1    Dec. 26, 2002

(30) Foreign Application Priority Data

Jun. 25, 2001  (JP)  ............... 2001-191077

(51) Int. Cl.
*H04N 5/50*    (2006.01)
(52) U.S. Cl. ......................... 348/569; 386/83
(58) Field of Classification Search ................ 348/552, 348/569, 553, 725, 584, 564, 734, 460; 345/788; 725/80, 133, 141, 153; 386/83
See application file for complete search history.

(56) References Cited

U.S. PATENT DOCUMENTS

| | | | |
|---|---|---|---|
| 5,574,965 A * | 11/1996 | Welmer ................ 725/151 |
| 5,856,852 A * | 1/1999 | Huh ...................... 348/460 |
| 5,929,931 A | 7/1999 | Hoekstra | |
| 6,057,813 A | 5/2000 | Matsumoto | |
| 6,137,539 A * | 10/2000 | Lownes et al. ......... 348/569 |
| 6,226,047 B1 | 5/2001 | Ryu | |
| 6,292,618 B1 * | 9/2001 | Ohara et al. ............ 386/46 |
| 6,344,880 B1 * | 2/2002 | Takahashi et al. ...... 348/563 |
| 6,504,847 B1 * | 1/2003 | Horlander ............... 370/431 |
| 6,665,020 B1 * | 12/2003 | Stahl et al. ............. 348/552 |
| 6,839,071 B1 * | 1/2005 | Miyamoto ............... 715/788 |

FOREIGN PATENT DOCUMENTS

| | | |
|---|---|---|
| EP | 0896318 A2 | 2/1999 |
| EP | 0896318 A3 | 1/2000 |
| EP | 1022898 A2 | 7/2000 |
| WO | WO 99/14945 | 3/1999 |
| WO | WO 99/27710 | 6/1999 |
| WO | WO 99/66720 | 12/1999 |
| WO | WO 00/69172 | 11/2000 |

* cited by examiner

*Primary Examiner*—Victor R. Kostak
(74) *Attorney, Agent, or Firm*—Armstrong, Kratz, Quintos, Hanson & Brooks, LLP

(57) ABSTRACT

A method for controlling a plurality of devices including a video cassette recorder having a function for transmitting state data representing a state of the video cassette recorder to a TV receiver in response to a request for state made by the TV receiver, and a function for multiplexing the display of state representing the state of the video cassette recorder onto the reproduced image and transmitting the multiplexed result to the TV receiver. When a change occurs in the state of the video cassette recorder, and a request for state is made by the receiver, the video reproducing device ceases its OSD function. On the other hand, when a change occurs in the state of the video cassette recorder, and no request for state is made by the receiver 1, the OSD function is brought into an operation.

3 Claims, 2 Drawing Sheets

METHOD FOR MUTUALLY CONTROLLING A PLURALITY OF VIDEO DISPLAY AND REPRODUCING DEVICES

BACKGROUND OF THE INVENTION

1. Field of the Invention

The present invention relates to a method for controlling a plurality of devices in which the plurality of devices are connected to one another, and in which the devices are mutually controlled by communication between the devices.

2. Description of the Related Art

In recent years, audio video (AV) systems conforming to a standard entitled Project 50 protocol (AV-LINK) have been developed in Europe. Such AV systems have, for example, a TV receiver 1 and a video cassette recorder 2 connected to each other via a "21 PIN" connector as shown in FIG. 1. Alternatively, it is possible to construct a larger-scale AV system by having another AV device such as a DVD player provided between the TV receiver 1 and the video cassette recorder 2. With the AV system conforming to the Project 50 protocol, the transmit and receipt of commands between a plurality of AV devices control mutually the operation of the AV devices.

The AV devices including the TV receiver 1, the video cassette recorder 2 and the like have installed therein so-called OSD (on-screen display) function for multi-displaying the state of its own and the other devices and manipulation menu, etc. on a screen of the TV receiver 1, providing easy manipulation for the user.

However, the AV system conforming to the Project 50 protocol has a problem as follows, when a video signal reproduced from the video cassette recorder 2, for example, is fed to the TV receiver 1 to have the signal shown on a screen 11. When the video cassette recorder 2 makes a mode change, for example, from "STOP" to "PLAY", the OSD function of the recorder 2 prepares a multiple video signal which multiplexes the mode change display onto reproduced image, supplying the signal to the TV receiver 1. On the other hand, the TV receiver 1 detects the mode change of the video cassette recorder 2 based on state data received from the video cassette recorder 2, allowing the OSD function of the receiver 1 to multi-display the mode change on the screen 11.

As a result, the TV receiver 1 has displayed on the screen 11 the mode display according to the OSD function of the recorder 2 and the mode display according to that of the receiver 1 as overlapped. In the case where the manufacturer of the receiver 1 is different from that of the recorder 2, for example, the two mode displays are different in timing and method due to the difference in a specification and concept between the manufacturers, entailing the problem that the screen looks disturbed, and contents displayed are hardly read when the two mode displays are overlapped at a same position.

SUMMARY OF THE INVENTION

An object of the present invention is to provide a method for controlling a plurality of devices in which the plurality of devices includes at least one video display device and at least one video reproducing device, which are connected to one another, the method avoiding the overlap between the display of state according to an OSD function of the video display device and the display of state according to an OSD function of the video reproducing device.

A method for controlling a plurality of devices embodying the present invention having a video reproducing device, the method comprising the steps of:

transmitting to a video display device state data representing a state of the video reproducing device in response to a request for state from the video display device;

preparing a multiple video signal by multiplexing a display of state representing the state of in video reproducing device onto a reproduced image, and transmitting the signal to the video display device; and ceasing a multiplexing operation (OSD operation) when a change occurs in the state of the video reproducing device and the request for state is made by the video display device, while causing the multiplexing operation (OSD operation) to be performed when a change occurs in the state of the video reproducing device and no request for state is made by the video display device.

Furthermore, a state request is made requesting the video reproducing device to transmit state data, and the state of the video reproducing device is multiplexed onto reproduced image display of state in response to the state data received from the video reproducing device, and the multiplexed result of the video reproducing device is displayed its own screen.

Furthermore, the video display means comprises state request means for requesting the video reproducing device to transmit state data, and multiplexing display means for multiplexing onto reproduced image display of state representing the state of the video reproducing device in response to the state data received from the video reproducing device, and displaying the multiplexed result on its own screen.

With the method for controlling a plurality of devices embodying the invention, the video display device requests the video reproducing device to transmit the state data at a suitable time in order to display the state of the video reproducing device. The video reproducing device always monitors the request for state (request for state data) from the video display device, if any. When there is the request for state from the video display device and a change occurs in the state of its own device, the video reproducing device ceases the OSD function. This causes the state of the video reproducing device to be multi-displayed on the screen of the video display device based on the OSD function of the video display device.

On the other hand, the video reproducing device brings its OSD function into an operation when there is no request for state from the video display device and a change occurs in the state of its own device. This causes the video display device to multi-display the state of the video reproducing device on its screen based on the OSD function of the video reproducing device. In this case, the video display device does not make a request for state to the video reproducing device, so that the video display device does not bring its OSD function into an operation.

As described above, with the method for controlling a plurality of devices embodying the invention, the display of state according to the OSD function of the video display device and that according to the OSD function of the video reproducing device are not overlapped, and the video display device shows the display of state according to either of the two OSD functions, allowing the display to be shown clearly.

DETAILED DESCRIPTION OF EMBODIMENTS

Figure 1:
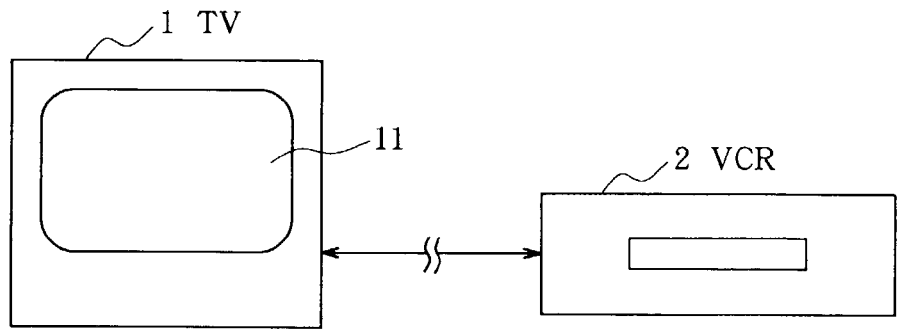
FIG. 1 is a block diagram showing the construction of devices of an AV system using the method according to the invention.

An AV system conforming to the Project 50 protocol embodying the present invention will be described below with reference to the drawings. The AV system of the invention has a TV receiver 1 connected each other to a video cassette recorder 2 via a "21 PIN" connector, as shown in FIG. 1. Video signals reproduced from the video cassette recorder 2 are fed to the TV receiver 1, enabling the reproduced image to be shown on its screen 11. Installed between the TV receiver 1 and the video cassette recorder 2 are a plurality of other AV devices (not shown) such as a DVD player.

The TV receiver 1 and the video cassette recorder 2 each has an OSD function for multi-displaying on the screen 11 of the TV receiver 1 the state of operation (mechanism mode) of its own and other devices, a selected channel of a tuner, and the state of the device including the state of setting of program recording.

The TV receiver 1 and the video cassette recorder 2 each have an OSD function for multi-displaying on the screen 11 of the TV receiver 1 the state of operation (mechanism mode) of its own and other devices, a selected channel of a tuner, and the state of the device including the state of setting of program recording.

Figure 2:
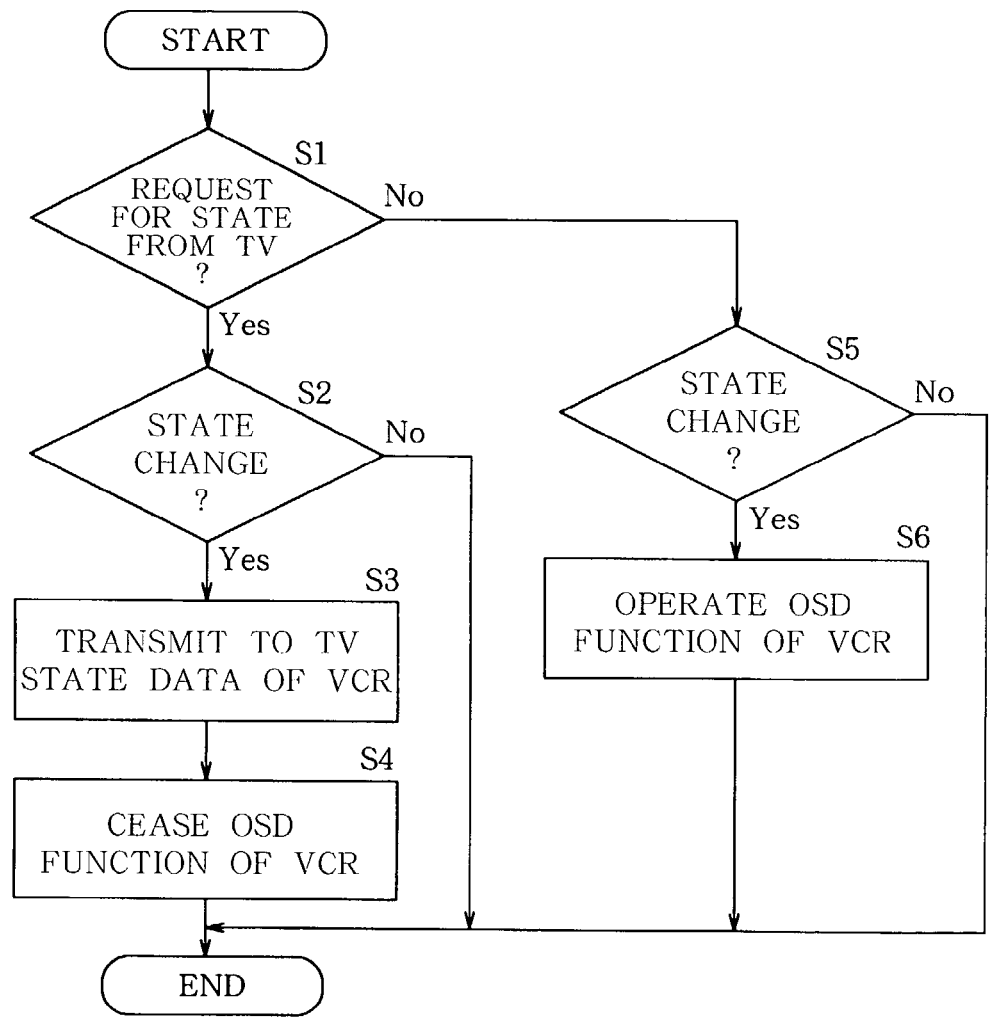
FIG. 2 is a flow chart showing an OSD control procedure to be executed by a video cassette recorder.

FIG. 2 shows an OSD control procedure to be executed by the video cassette recorder 2. First in step S1, an inquiry is made as to whether the TV receiver 1 makes a request for state data. If the inquiry is answered in the affirmative, step S2 follows to make an inquiry as to whether a change occurs in the state of its own device. When the answer is affirmative, step S3 follows to transmit state data of the video cassette recorder 2 to the receiver 1. In step S4, an OSD function of the video cassette recorder 2 is ceased. As a result, the state of the device of the video cassette recorder 2 is multi-displayed on the screen 11 of the receiver 1 based on an OSD function of the TV receiver 1.

On the other hand, when the TV receiver 1 makes no request for state data, and the answer in step S1 is in the negative, step S5 follows to inquire whether a change occurs in the state of its own device. If the answer is the affirmative, the OSD function of the video cassette recorder 2 is brought into an operation.

As a result, the state of the device of the video cassette recorder 2 is multi-displayed on the screen 11 of the receiver 1 based on the OSD function of the video cassette recorder 2. In this case the TV receiver 1 makes no request for state to the video cassette recorder 2, and does not receive state data from the recorder 2, so that the receiver 1 does not operate its own OSD function.

Figure 3:
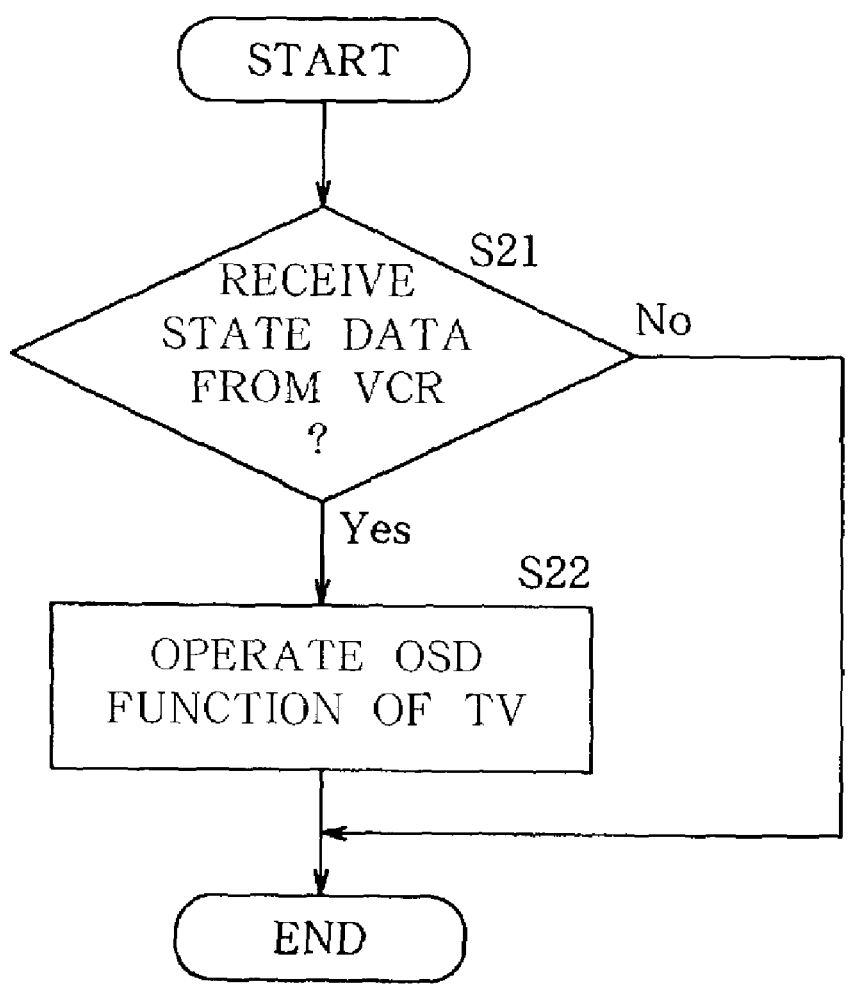
FIG. 3 is a flow chart showing an OSD control procedure to be executed by a TV receiver.

Furthermore, FIG. 3 shows an OSD control procedure to be executed by the TV receiver 1. First in step S21, an inquiry is made as to whether state data is received from the video cassette recorder 2. If the answer is the affirmative, step S22 follows to operate the OSD function of the TV receiver 1. As a result, the state of the device of the video cassette recorder 2 is multi-displayed on the screen 11 of the TV receiver 1.

As stated above, with the method for controlling the AV system of the present invention, when the TV receiver 1 multi-displays the state of the device of the video cassette recorder 2 using its own OSD function, the OSD function of the video cassette recorder 2 is ceased. Only when the TV receiver 1 does not bring its own OSD function into an operation, the OSD function of the video cassette recorder 2 is brought into an operation. Accordingly, the state display according to the OSD function of the TV receiver 1 and the state display according to the OSD function of the video cassette recorder 2 are not overlapped, allowing the display of the state of the device to be shown clearly.

The method of the present invention is not limited to the foregoing embodiment but can be modified variously by one skilled in the art without departing from the spirit of the invention as set forth in the appended claims. For example, the video reproducing device constituting the AV system is not limited only to the video cassette recorder 2, but can be various AV devices already known including a DVD player, etc.

What is claimed is:

1. A method for controlling a plurality of devices including at least one video display device and at least one video reproducing device, which are connected to one another, the one video display device and the one video reproducing device each having an on-screen display function, the devices being mutually controlled by communication between the devices, the method comprising the steps of:

transmitting to the video display device state data representing a state of the video reproducing device in response to a request for state from the video display device to the video reproducing device;

preparing a multiple video signal by multiplexing a display of state representing the state of the video reproducing device onto a reproduced image, and transmitting the signal to the video display device; and ceasing a multiplexing operation by the video reproducing device to multi-display the state of the video reproducing device on a screen of the video display device according to the on-screen display function of the video display device when a change occurs in the state of the video reproducing device and the request for state is made from the video display device to the video reproducing device, and performing, the multiplexing operation by the video reproducing device to multi-display the state of the video reproducing device on the screen of the video display device according to the on-screen display function of the video reproducing device when a change occurs in the state of the video reproducing device and no request for state is made from the video display device to the video reproducing device.

2. The method for controlling a plurality of devices according to claim 1, further comprising the steps of multiplexing onto the reproduced image the display of state representing the state of the video reproducing device in response to the state data received from the video reproducing device, and displaying the multiplexed result on the screen of the video display device.

3. The method for controlling a plurality of devices according to claim 2, further comprising the step of requesting the video reproducing device to transmit the state data.

* * * * *